(12) United States Patent
Zhao et al.

(10) Patent No.: US 12,457,866 B2
(45) Date of Patent: Oct. 28, 2025

(54) DISPLAY ASSEMBLY, DISPLAY APPARATUS, AND FINGERPRINT RECOGNITION METHOD

(71) Applicant: HUAWEI TECHNOLOGIES CO., LTD., Guangdong (CN)

(72) Inventors: Yang Zhao, Shenzhen (CN); Xinkai Wu, Shanghai (CN); CHunyen Liu, Dongguan (CN); Xiaojun Guo, Shanghai (CN); Hu He, Dongguan (CN); Xiaokuan Yin, Shanghai (CN); Xiao Hou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 17/915,909

(22) PCT Filed: Mar. 23, 2021

(86) PCT No.: PCT/CN2021/082248
§ 371 (c)(1),
(2) Date: Sep. 29, 2022

(87) PCT Pub. No.: WO2021/197118
PCT Pub. Date: Oct. 7, 2021

(65) Prior Publication Data
US 2023/0144932 A1 May 11, 2023

(30) Foreign Application Priority Data
Mar. 31, 2020 (CN) .......................... 202010246037.8

(51) Int. Cl.
G06V 40/13 (2022.01)
G02F 1/1333 (2006.01)
(Continued)

(52) U.S. Cl.
CPC ....... *H10K 59/131* (2023.02); *G02F 1/13338* (2013.01); *G06V 40/1318* (2022.01);
(Continued)

(58) Field of Classification Search
CPC ...................... G06V 40/1318; G02F 1/13338; H10K 39/34; H10K 59/12; H10K 59/60; H10K 59/131; H10K 59/123; H10K 59/40
See application file for complete search history.

(56) References Cited

U.S. PATENT DOCUMENTS

2011/0043473 A1* 2/2011 Kozuma ................. G06F 3/042
345/173
2011/0121296 A1* 5/2011 Auman ............... H01L 27/1218
438/479
(Continued)

FOREIGN PATENT DOCUMENTS

CN 104009067 A 8/2014
CN 104850292 A 8/2015
(Continued)

OTHER PUBLICATIONS

Extended European Search Report in European Appln No. 21780145.5, dated Jun. 22, 2023, 7 pages.
(Continued)

*Primary Examiner* — Jonathan A Boyd
(74) *Attorney, Agent, or Firm* — Fish & Richardson P.C.

(57) ABSTRACT

The present disclosure relates to display assemblies, display apparatuses, and fingerprint recognition methods. One example display assembly includes a display panel and a fingerprint recognition module located on a light-emitting surface of the display panel. The fingerprint recognition module includes multiple fingerprint recognition units. Each fingerprint recognition unit includes at least one phototransistor and one switch transistor. The phototransistor includes
(Continued)

a first active layer, a first gate, a first source, and a first drain. A material for making the first active layer includes an organic semiconductor material. The first drain and the first gate partially overlap to form a first capacitor. The switch transistor includes a second active layer, a second gate, a second source, and a second drain. The fingerprint recognition module includes a first metal layer. The first source, the first drain, the second source, and the second drain are all located at the first metal layer.

20 Claims, 10 Drawing Sheets

(51) Int. Cl.
*H10K 39/34* (2023.01)
*H10K 59/131* (2023.01)
*H10K 59/65* (2023.01)
*H10K 59/12* (2023.01)

(52) U.S. Cl.
CPC ............ *H10K 39/34* (2023.02); *H10K 59/65* (2023.02); *H10K 59/12* (2023.02)

(56) References Cited

U.S. PATENT DOCUMENTS

| | | | |
|---|---|---|---|
| 2013/0092927 A1* | 4/2013 | Murai | H01L 27/1222 257/43 |
| 2018/0173349 A1 | 6/2018 | Cho et al. | |
| 2021/0149249 A1* | 5/2021 | Chen | G02F 1/133514 |
| 2021/0216735 A1* | 7/2021 | Guo | G06V 40/1306 |

FOREIGN PATENT DOCUMENTS

| | | | | |
|---|---|---|---|---|
| CN | 105184247 A | 12/2015 | | |
| CN | 106055162 A | 10/2016 | | |
| CN | 106096595 A | 11/2016 | | |
| CN | 106326845 A | 1/2017 | | |
| CN | 107425041 A | 12/2017 | | |
| CN | 107885361 A | 4/2018 | | |
| CN | 108121478 A | 6/2018 | | |
| CN | 109656048 A | 4/2019 | | |
| CN | 109685003 A | 4/2019 | | |
| CN | 110008885 A | 7/2019 | | |
| CN | 110286796 A | 9/2019 | | |
| JP | 2006503333 A | 1/2006 | | |
| JP | 2007310628 A | 11/2007 | | |
| JP | 2015159133 A | 9/2015 | | |
| JP | 2016095886 A | 5/2016 | | |
| JP | 2019165129 A | * | 9/2019 | ......... H01L 127/144 |
| KR | 20180117748 A | 10/2018 | | |
| WO | 2011125353 A1 | 10/2011 | | |

OTHER PUBLICATIONS

International Search Report and Written Opinion in International Appln. No. PCT/CN2021/082248, mailed on May 11, 2021, 16 pages (with English translation).
Office Action in Japanese Appln. No. 2022-559713, mailed on Oct. 2, 2023, 12 pages (with English translation).

* cited by examiner

DISPLAY ASSEMBLY, DISPLAY APPARATUS, AND FINGERPRINT RECOGNITION METHOD

CROSS-REFERENCE TO RELATED APPLICATIONS

This application is a national stage of International Application No. PCT/CN2021/082248, filed on Mar. 23, 2021, which claims priority to Chinese Patent Application No. 202010246037.8, filed on Mar. 31, 2020. Both of the aforementioned applications are hereby incorporated by reference in their entireties.

TECHNICAL FIELD

This application relates to the field of display technologies, and more specifically, to a display assembly, a display apparatus, and a fingerprint recognition method.

BACKGROUND

Currently, in-screen optical fingerprint recognition has become a mainstream method for identity recognition of a current electronic device. An optical fingerprint recognition module is disposed on a back side of a substrate of a display panel, and light emitted by a fingerprint recognition light source irradiates to a finger. After being reflected by the finger, the light penetrates through the display panel, and then is received by a photosensitive element, to convert an optical signal into an electrical signal. This implements fingerprint recognition. In a solution in the conventional technology, after light used for fingerprint recognition penetrates through an entire display panel in a thickness direction of the display panel, light loss is large. This seriously affects an amount of light received by the photosensitive element, and further affects accuracy of fingerprint recognition.

SUMMARY

In view of this, this application provides a display assembly, a display apparatus, and a fingerprint recognition method, to resolve a technical problem of low fingerprint recognition accuracy in the conventional technology.

According to a first aspect, an embodiment of this application provides a display assembly, including a display panel and a fingerprint recognition module located on a light-emitting surface of the display panel. The fingerprint recognition module includes a plurality of fingerprint recognition units, and each fingerprint recognition unit includes at least one phototransistor and one switch transistor.

The phototransistor includes a first active layer, a first gate, a first source, and a first drain. A material for making the first active layer includes an organic semiconductor material. In a direction perpendicular to the display assembly, the first drain and the first gate partially overlap to form a first capacitor.

The switch transistor includes a second active layer, a second gate, a second source, and a second drain.

The fingerprint recognition module includes a first metal layer. The first source, the first drain, the second source, and the second drain are all located at the first metal layer, and the first drain is connected to the second source.

In this embodiment of this application, the fingerprint recognition module is disposed on the light-emitting surface of the display panel. During fingerprint recognition, light reflected by a finger can be received by the fingerprint recognition module without penetrating through a structural film layer of the display panel. This shortens a transmission distance of fingerprint reflected light, and can improve collimation of the fingerprint reflected light, avoid a light loss caused when the fingerprint reflected light penetrates through the structural film layer of the display panel, and ensure fingerprint recognition accuracy. In addition, the phototransistor is used as a photosensitive element in the fingerprint recognition module. A structure of the phototransistor is similar to that of the switch transistor. During making, the phototransistor and the switch transistor can share at least a part of a making process. This can reduce structure and process complexity of the display assembly, and can also help reduce an overall thickness of the display assembly.

Further, the fingerprint recognition module further includes a second metal layer and a first insulation layer. The second metal layer is located on a side that is of the first metal layer and that is close to the display panel. The first insulation layer is located between the first metal layer and the second metal layer. The first gate is located at the second metal layer. The phototransistor is a transistor of a bottom gate structure, and the first gate does not shield light emitted to the first active layer. This ensures that the fingerprint reflected light can be emitted to the first active layer in a fingerprint recognition phase, so that the phototransistor converts an optical signal into an electrical signal.

Further, both the first active layer and the second active layer are located on a side that is of the first insulation layer and that is away from the second metal layer, and are in contact with the first insulation layer. It is equivalent to that the first active layer and the second active layer are located at a height of a same film layer. This can help reduce a thickness of a film layer of the fingerprint recognition module, and further help reduce an overall thickness of the display assembly.

In an embodiment, the first source is not connected to the first gate, and the fingerprint recognition module includes a fingerprint control signal line, a fingerprint data signal line, a first voltage signal line, and a second voltage signal line. The second gate is electrically connected to the fingerprint control signal line, the second drain is electrically connected to the fingerprint data signal line, the first gate is electrically connected to the first voltage signal line, and the first source is electrically connected to the second voltage signal line. In a fingerprint recognition phase, a voltage supplied by the first voltage signal line to the first gate is greater than a voltage supplied by the second voltage signal line to the first source.

In an embodiment, the first source is connected to the first gate through a via in the first insulation layer. The first gate and the first source of the phototransistor are connected, so that the phototransistor always works in an off status. In this case, when no light irradiates to a surface of the first active layer, a leakage current of the phototransistor is very small. However, in the fingerprint recognition phase, when the fingerprint reflected light irradiates to the surface of the first active layer, a carrier generated inside the first active layer enables the leakage current of the phototransistor to increase obviously, so that it can be ensured that the phototransistor has high optical sensitivity.

The fingerprint recognition module includes a fingerprint control signal line, a fingerprint data signal line, and a third voltage signal line.

The second gate is electrically connected to the fingerprint control signal line, the second drain is electrically connected to the fingerprint data signal line, and both the first gate and the first source are electrically connected to the third voltage signal line. Only three types of signal lines need to be disposed in the fingerprint recognition module: the fingerprint control signal line, the fingerprint data signal line, and the third voltage signal line. This can also simplify a wiring manner in the fingerprint recognition module, and reduce space occupied by wiring.

Optionally, the second gate is located at the second metal layer. In this case, both the switch transistor and the phototransistor are of a bottom gate structure. The switch transistor and the phototransistor have a same structure, and can be manufactured in a same process. This improves fingerprint recognition accuracy, and further reduces structure and process complexity of the display assembly.

Optionally, the second active layer and the first active layer are made of a same material at a same layer. Both a pattern of the first active layer and a pattern of the second active layer are formed in a same process, so that the process can be further simplified, and complexity of the process can be reduced.

Further, the fingerprint recognition module further includes a plurality of light shielding parts. The light shielding part is located on a side that is of the second active layer and that is away from the display panel, and an orthographic projection of the light shielding part on a plane on which the second active layer is located covers the second active layer. When the second active layer and the first active layer are made of the same material at the same layer, the light shielding part can shield light, to prevent the light from irradiating on a surface of the second active layer, so that a carrier inside the second active layer increases. This avoids impact on an on/off status of the switch transistor, and ensures accuracy and performance reliability of fingerprint recognition detection.

In an embodiment, the fingerprint recognition module further includes a third metal layer. The third metal layer is located on a side that is of the first metal layer and that is away from the display panel, and the second gate is located at the third metal layer. In the fingerprint recognition phase, the second gate disposed on a side that is of the second active layer and that is away from the display panel can be reused as the light shielding part.

Specifically, the display panel includes a plurality of pixel areas and a non-pixel area located between the adjacent pixel areas. An orthographic projection of the fingerprint recognition unit on the display panel is located in the non-pixel area. During display, the fingerprint recognition unit does not shield light emitted from the pixel area. This ensures that a deposition of the fingerprint recognition module does not affect a display effect.

Based on a same inventive concept, an embodiment of this application provides a display apparatus, including a display assembly according to any embodiment of this application.

Based on a same inventive concept, an embodiment of this application provides a fingerprint recognition method, and the fingerprint recognition method is applicable to a display assembly according to any embodiment of this application. The fingerprint recognition method includes:

controlling both the switch transistor and the phototransistor to be turned off, and charging the first capacitor to accumulate an amount of initial charge under an action of a leakage current of the phototransistor;

controlling the switch transistor to be turned on, discharging the first capacitor, and controlling the switch transistor to be turned off after reading the amount of initial charge through the second drain;

after the phototransistor receives light reflected by a finger, increasing the leakage current, and charging the first capacitor to accumulate an amount of fingerprint charge; and controlling the switch transistor to be turned on, discharging the first capacitor, and reading the amount of fingerprint charge through the second drain.

The display assembly, the display apparatus, and the fingerprint recognition method provided in this application have the following beneficial effects: The fingerprint recognition module is disposed on the light-emitting surface of the display panel. During fingerprint recognition, light reflected by a finger can be received by the fingerprint recognition module without penetrating through a structural film layer of the display panel. This shortens a transmission distance of fingerprint reflected light, and can improve collimation of the fingerprint reflected light, avoid a light loss caused when the fingerprint reflected light penetrates through the structural film layer of the display panel, and ensure fingerprint recognition accuracy. In addition, the phototransistor is used as a photosensitive element in the fingerprint recognition module. A structure of the phototransistor is similar to that of the switch transistor. During making, the phototransistor and the switch transistor can share at least a part of a making process. This can reduce structure and process complexity of the display assembly, and can also help reduce an overall thickness of the display assembly.

DESCRIPTION OF EMBODIMENTS

To reduce a light loss caused by light penetrating through a display panel and improve accuracy of fingerprint recognition, the following technical solution is proposed in a related technology: A photosensitive element is integrated into an array substrate of the display panel. During fingerprint recognition, light reflected by a finger can be received by the photosensitive element only by penetrating through an encapsulation structure of the display panel, a light emitting component layer, and some film layers in the array substrate. Alternatively, the photosensitive element is integrated between two adjacent light emitting components, so that light reflected by a finger can be received by the photosensitive element only by penetrating through an encapsulation structure of the display panel and some film layers of a light emitting component layer. Although the foregoing solution can shorten a transmission distance of fingerprint reflected light to some extent, structure and process complexity of the panel is still increased. In addition, the foregoing solution is usually applicable only to an organic light emitting display apparatus.

Another solution is further proposed in a related technology. A switch transistor and a photosensitive element (a photodiode) that are used for fingerprint recognition are disposed on an encapsulation film of a display panel. Although the transmission distance of the fingerprint reflected light is further shortened, the switch transistor and the photosensitive element have a large difference in structure and making process. In this case, the switch transistor and the photosensitive element need to be separately manufactured. Consequently, complexity of the making process of the panel is increased, and an overall thickness of a fingerprint recognition module including the switch transistor and the photosensitive element is also large.

Based on the foregoing problem, an embodiment of this application provides a display assembly, which is applicable to any type of display apparatus in the conventional technology, for example, an LCD (liquid crystal display, liquid crystal display), an OLED (organic electroluminesence display, organic electroluminesence display), or a micro LED (micro light emitting diode) display. A phototransistor and a switch transistor are integrated into a fingerprint recognition module and disposed on a light-emitting surface of a display panel, so that fingerprint recognition accuracy can be improved, and structure and process complexity of the display assembly can be reduced.

Figure 1:
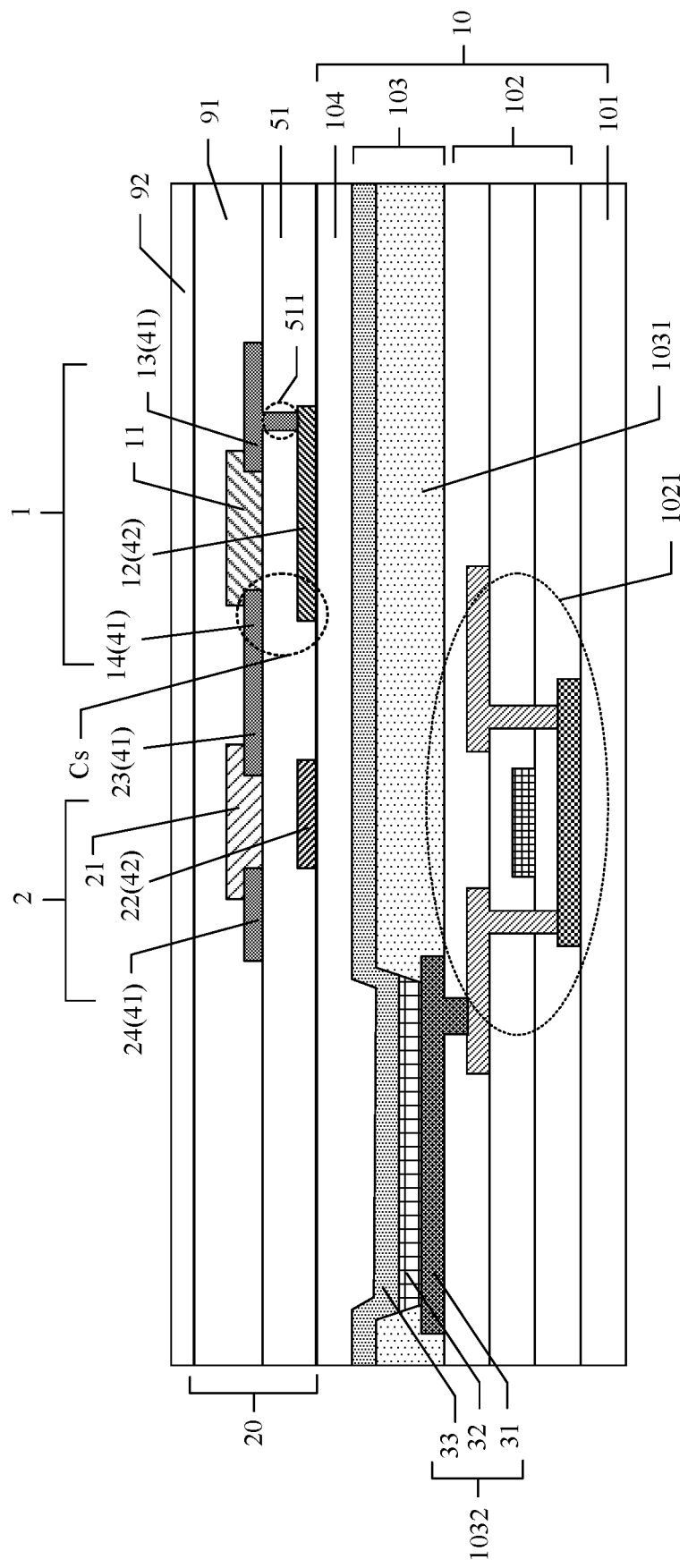
FIG. 1 is a schematic diagram of a partial structure of film layers of a display assembly according to an embodiment of this application.
Figure 2:
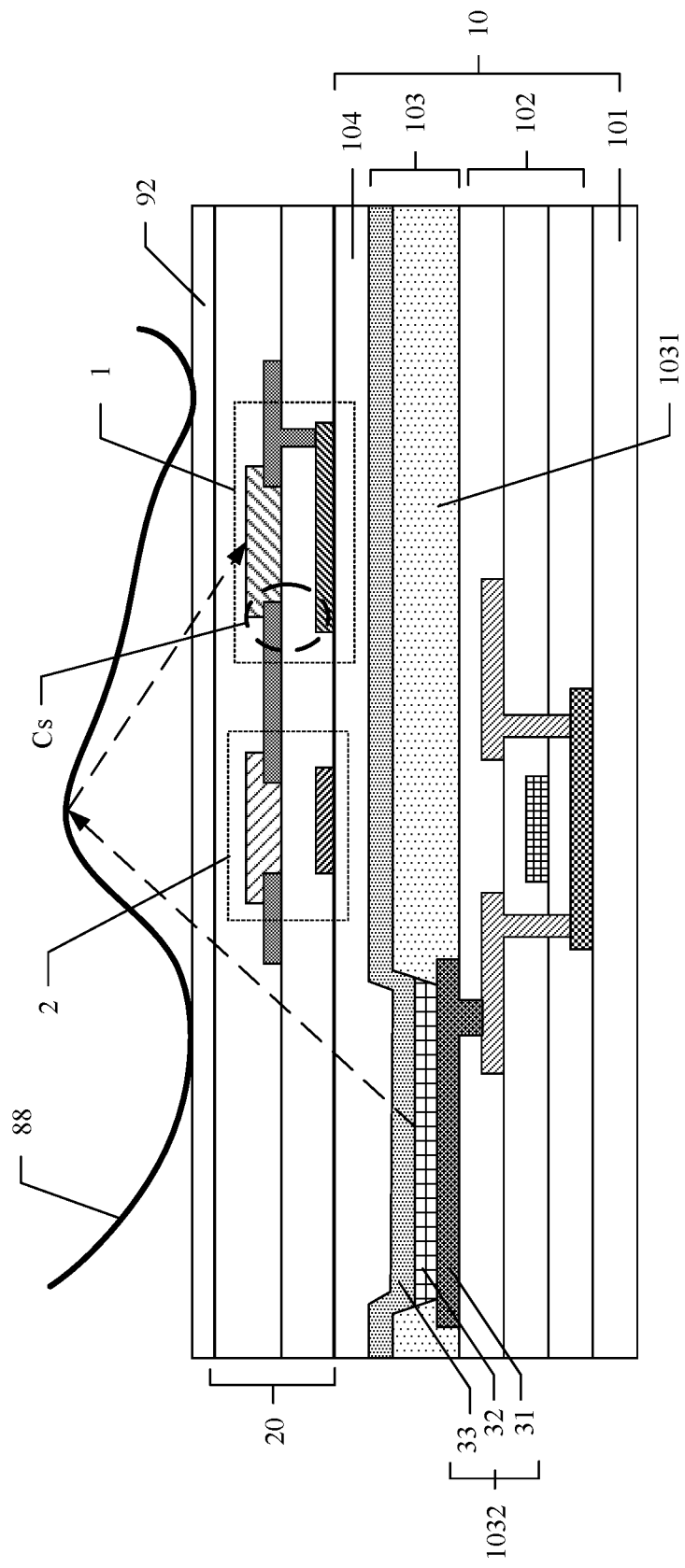
FIG. 2 is a schematic diagram of an optical path of light used for fingerprint detection by the display assembly in a fingerprint recognition phase according to the embodiment in FIG. 1.

FIG. 1 is a schematic diagram of a partial structure of film layers of a display assembly according to an embodiment of this application. FIG. 2 is a schematic diagram of an optical path of light used for fingerprint detection by the display assembly in a fingerprint recognition phase according to the embodiment in FIG. 1.

As shown in FIG. 1, the display assembly includes a display panel 10 and a fingerprint recognition module 20 located on a light-emitting surface of the display panel 10. The light-emitting surface of the display panel 10 is a surface of a side on which the display panel displays a picture. The display panel 10 is any one of an organic light emitting display panel, a liquid crystal display panel, or a microdiode display panel. FIG. 1 shows only an example in which the display panel is an organic light emitting display panel. The display panel 10 includes a substrate 101, an array substrate 102, a display layer 103, and an encapsulation structure 104. In this case, the light-emitting surface of the display panel 10 is an outer surface of a side that is of the encapsulation structure 104 and that is away from the display layer 103. The substrate 101 may be a flexible substrate or a rigid substrate. The array substrate 102 includes a plurality of pixel circuits, and only a drive transistor 1021 in the pixel circuit is shown in the figure. The display layer 103 includes a pixel definition layer 1031 and a plurality of light emitting components 1032. Only one light emitting component 1032 is shown in the figure. The light emitting component 1032 includes an anode 31, a light emitting layer 32, and a cathode 33 that are stacked in sequence. The anode 31 is electrically connected to the drive transistor 1021 through a via. The encapsulation structure 104 is configured to encapsulate the display layer 103 to isolate water and oxygen, so as to ensure a service life of the light emitting component. The encapsulation structure 104 may be rigid encapsulation, and includes an encapsulation cover and a sealant. Alternatively, the encapsulation structure 104 may be thin film encapsulation, and includes at least one organic encapsulation layer and at least one inorganic encapsulation layer that are alternately stacked.

The fingerprint recognition module 20 includes a plurality of fingerprint recognition units, and each fingerprint recognition unit includes at least one phototransistor 1 and one switch transistor 2 connected to the phototransistor 1. Only one fingerprint recognition unit is shown in the figure. The phototransistor 1 is used as a photosensitive element, and can convert an optical signal into an electrical signal after receiving fingerprint reflected light in a fingerprint recognition phase. The switch transistor 2 is electrically connected to the phototransistor 1. The switch transistor 2 is configured to read a fingerprint electrical signal and output the electrical signal to a fingerprint data processing module. Finally, the fingerprint data processing module performs operation processing on the electrical signal, to generate fingerprint information.

The phototransistor 1 includes a first active layer 11, a first gate 12, a first source 13, and a first drain 14. A material for making the first active layer 11 includes an organic semiconductor material. In a direction perpendicular to the display assembly, the first drain 14 and the first gate 12 partially overlap to form a first capacitor Cs. The organic semiconductor material is any one or more of pentacene (pentacene), 6,13-bis(triisopropylsilanesylacetylene)-pentene (TIPS-pentacene), copper phthalocyanine (CuPc), (dinaphtho[2,3-b:2',3'-f]thieno[3,2-b]thiophene) (DNTT), 2,6-bis(methoxyphenyl)anthracene(BOPAnt), poly-3-hexylthiophene(P3HT), poly[bis(3-dodecyl-2-thienyl)-2,2'-dithiophene-5,5'-diyl] (poly[bis(3-dodecyl-2-thienyl)-2,2'-dithiophene-5,5'-diyl], PQT-12), PDVT-10(poly[2,5-bis(alkyl) pyrrolo[3,4-c]-1,4(2H,5H)-dione-alt-5,5'-di(thiophene-2-yl)-2,2'-(E)-2-(2-(thiophen-2-yl)vinyl) thiophene]), and diketopyrrolo-pyrrole dithienylthieno[3,2-b] thiophene (DPP-DTT). When the first active layer 11 is being manufactured, a film may be coated by using a solution method, and then a pattern of the first active layer 11 is formed by using an etching process. The first active layer 11 may alternatively be formed by forming a film by using a deposition method. The organic semiconductor material strongly absorbs light. The first active layer 11 is used as a light sensing layer. When light irradiates to a surface of the first active layer 11, an electron-hole pair is correspondingly generated inside the first active layer 11 each time a photon is absorbed. Due to an action of an electric field, electrons and holes are separated to generate charge carriers, and the charge carriers migrate inside the material to form a current. This implements converting an optical signal into an electrical signal. Different organic semiconductor materials have different light-sensitive bands. Actually, fingerprint recognition may be implemented by matching a light-sensitive band of an organic semiconductor material with a fingerprint recognition light source. The first active layer selects an organic semiconductor material that is sensitive to visible light, for example, an organic semiconductor material that is sensitive to green light, so that a corresponding fingerprint recognition light source emits green light. Alternatively, the first active layer selects an organic semiconductor material that is sensitive to infrared light, so that a corresponding fingerprint recognition light source emits infrared light.

A working state of the phototransistor 1 includes a dark state and an illumination state. The dark state of the phototransistor 1 is a state when no light irradiates to the surface of the first active layer 11. In the dark state, when a bias voltage is applied to the phototransistor 1, there is a small leakage current in the first active layer 11. Correspondingly, the illumination state of the phototransistor 1 is a state when light irradiates to the surface of the first active layer 11. In the illumination state, there is a small leakage current and a photocurrent generated by light excitation in the first active layer 11.

The switch transistor 2 includes a second active layer 21, a second gate 22, a second source 23, and a second drain 24. A material for making the second active layer 21 may be a silicon semiconductor material, such as a monocrystalline silicon semiconductor or a polycrystalline silicon semiconductor, or may be an organic semiconductor material. The material for making the second active layer 21 includes any one or more of pentacene, TIPS-pentacene, CuPc, DNTT, BOPAnt, P3HT, PQT-12, PDVT-10, DPP-DTT, 2,7-diocty[1]benzothieno[3,2-B]benzothiophene (C8-BTBT), [4,4,9,9-tetra(4-hexylphenyl)-s-benzodipyridine[1,2-b:5,6-b']dithiophene]-benzothiodiazole copolymer (C16-IDTBT), 2,8-difluoro-5,11-bis(triethylsilylethynyl)anthradithiophene (diF-TES-ADT), 2,9-diphenyl-dinaphtho[2,3-b:2',3'-f]thieno[3,2-b]thiophene (Dph-DNTT). The second active layer 21 and the first active layer 11 may be made of a same material, or the second active layer 21 and the first active layer 11 may be made of different materials.

The fingerprint recognition module 20 includes a first metal layer 41. The first source 13, the first drain 14, the second source 23, and the second drain 24 are all located at the first metal layer 41, and the first drain 14 is connected to the second source 23. In other words, in a making process of the display assembly, the first source 13, the first drain 14, the second source 23, and the second drain 24 may be manufactured in a same etching process, so that complexity of the process may be reduced. Optionally, as shown in FIG. 1, the first drain 14 and the second source 23 are integrally formed to form a common electrode, one end of the common electrode is used as the first drain 14, and the other end of the common electrode is used as the second source 23.

As shown in FIG. 1, the fingerprint recognition module 20 further includes a passivation layer 91 above the first active layer 11 and the second active layer 21. The passivation layer 91 may have both insulation and planarization functions. The display assembly further includes a protective cover 92 located on the fingerprint recognition module 20. The protective cover 92 may be a rigid cover, or may be a flexible cover. Optionally, an anti-impact layer (not shown in the figure) is further disposed between the passivation layer 91 and the protective cover 92. The anti-impact layer can buffer an external force borne by the display assembly, to protect each component in the display assembly from being damaged by the external force.

The display assembly according to this embodiment of this application can implement a fingerprint recognition function. A fingerprint recognition light source required for implementing the fingerprint recognition function may be an external light source, for example, a visible light source or an infrared light source. During application, the external light source is disposed on a side that is of the display panel and that is away from the fingerprint recognition module. When the display panel is an organic light emitting display panel, a light emitting component on the display panel may be reused as the fingerprint recognition light source. FIG. 2 shows only an example in which the light emitting component 1032 is reused as a fingerprint recognition light source. As shown in FIG. 2, in the fingerprint recognition phase, after light emitted by the light emitting component 1032 is emitted from the light-emitting surface of the display panel 10, the light sequentially penetrates through the fingerprint recognition module 20 and the protective cover 92, and then irradiates to a finger 88 of a user. The light reflected by the finger penetrates through the protective cover 92 again and then irradiates to the first active layer of the phototransistor 1. After absorbing the fingerprint reflected light, the first active layer converts the optical signal into an electrical signal.

In a fingerprint recognition method to which the display assembly according to this embodiment of this application can be applied, a working process of a fingerprint recognition unit is used as an example. Fingerprint recognition includes a startup phase, an initial signal reading phase, a fingerprint signal accumulation phase, and a fingerprint signal reading phase.

In the startup phase, when the switch transistor 2 and the phototransistor 1 are controlled to be turned off, the phototransistor 1 in the dark state and there is a small leakage current in the phototransistor 1. In this way, the first capacitor Cs formed between the first drain 14 and the first gate 12 of the phototransistor 1 is charged to accumulate a small amount of initial charge, which is recorded as an amount of initial charge Q0.

In the initial signal reading phase, when the switch transistor 2 is controlled to be turned on, the second source 23 and the second drain 24 of the switch transistor 2 are connected. Because the first drain 14 is connected to the second source 23, the first capacitor Cs discharges, the amount of initial charge Q0 is read through the second drain 24, and then the switch transistor 2 is controlled to be turned off.

In the fingerprint signal accumulation phase, after the phototransistor 1 receives the light reflected by the finger, the phototransistor 1 is in an illumination state, and the first active layer 11 is irradiated by the light to generate a charge carrier therein. In this case, a current in the phototransistor 1 increases, and an amount of charge accumulated during charging of the first capacitor Cs increases, which is recorded as an amount of fingerprint charge Q1. When the finger presses a surface of the display assembly, a fingerprint ridge of the finger is in direct contact with the surface of the display assembly, so that light emitted by the fingerprint recognition light source is received by the phototransistor 1 after being reflected on an interface on which the fingerprint ridge is in contact with the display assembly. There is air between a fingerprint valley and the surface of the display assembly, so that light emitted by the fingerprint recognition light source only can be received by the phototransistor 1 after penetrating through an interface between the display assembly and the air, being reflected by the fingerprint valley and then penetrating through the interface between the display assembly and the air again. Therefore, the light reflected by the ridge has light intensity larger than that of the light reflected by the valley. Correspondingly, in the fingerprint signal accumulation phase, a photocurrent generated when the phototransistor receives the light reflected by the ridge is larger than a photocurrent generated when the phototransistor receives the light reflected by the valley. In this case, more charge is accumulated on the first capacitor when the phototransistor receives the light reflected by the ridge. Therefore, in subsequent operation processing, the fingerprint valley and the fingerprint ridge may be distinguished based on a value of an amount of fingerprint charge.

In the fingerprint signal reading phase, when the switch transistor 2 is controlled to be turned on, the second source 23 and the second drain 24 of the switch transistor 2 are connected again, the first capacitor Cs discharges, and the amount of fingerprint charge Q1 is read through the second drain 24.

The amount of initial charge Q0 and the amount of fingerprint charge Q1 are respectively read through the second drain, and the amount of initial charge Q0 and the amount of fingerprint charge Q1 are transferred to the fingerprint data processing module (a module in a system mainboard). The fingerprint data processing module collects fingerprint detection signals returned by a plurality of fingerprint recognition units, and performs operation processing, to finally generate fingerprint information.

According to the display assembly provided in this embodiment of this application, the fingerprint recognition module is disposed on the light-emitting surface of the display panel. During fingerprint recognition, the light reflected by the finger can be received by the fingerprint recognition module without penetrating through a structural film layer of the display panel. This shortens a transmission distance of fingerprint reflected light, and can improve collimation of the fingerprint reflected light, avoid a light loss caused when the fingerprint reflected light penetrates through the structural film layer of the display panel, and improve fingerprint recognition accuracy. In addition, the phototransistor is used as a photosensitive element in the fingerprint recognition module. A structure of the phototransistor is similar to that of the switch transistor. During making, the phototransistor and the switch transistor can share at least a part of a making process. This can reduce structure and process complexity of the display assembly, and can also help reduce an overall thickness of the display assembly.

In addition, a light sensing effect (that is, a photosensitive effect) of the photosensitive element is related to an order of magnitude that can be achieved by dividing a photocurrent by a dark current. That is, a larger difference between the photocurrent and the dark current indicates a better light sensing effect and higher sensitivity of fingerprint recognition. The dark current is a leakage current of the photosensitive element in the dark state (in a state in which no light irradiates), and the photocurrent is a current generated when the photosensitive element is excited by light in the illumination state (in a state in which light irradiates). In a fingerprint recognition solution in a related technology, a photodiode is used as a photosensitive element, and a leakage current of the photodiode in a dark state is at an nA level. In this case, a light sensing area of the photodiode usually needs to be large, to ensure a light sensing effect of the photodiode. Consequently, a fingerprint recognition module including a switch transistor and a photodiode occupies a large area. When the fingerprint recognition module is disposed on a display surface of a display panel, the fingerprint recognition module greatly shields light emitted from the display panel. This affects a display effect. However, in this embodiment of this application, the phototransistor and the switch transistor form the fingerprint recognition unit. The leakage current of the phototransistor in the dark state is at a pA level. In other words, the leakage current of the phototransistor in the dark state is far less than the leakage current of the photodiode in the dark state. Therefore, the phototransistor in this application can have a good light sensing effect even when a size of the phototransistor is small. The phototransistor does not shield the light emitted from the display panel as it is disposed on the light-emitting surface of the display panel.

Still refer to FIG. 1. The fingerprint recognition module 20 further includes a second metal layer 42 and a first insulation layer 51. The second metal layer 42 is located on a side that is of the first metal layer 41 and that is close to the display panel 10. The first insulation layer 51 is located between the first metal layer 41 and the second metal layer 42. The first gate 12 is located at the second metal layer 42. That is, the first gate 12 of the phototransistor 1 is located on a side that is of the first active layer 11 and that is close to the display panel 10, the phototransistor 1 is a transistor of a bottom gate structure, and the first gate 12 does not shield light emitted to the first active layer 11. This ensures that the fingerprint reflected light can be emitted to the first active layer 11 in a fingerprint recognition phase, so that the phototransistor 1 converts an optical signal into an electrical signal.

In an embodiment, as shown in FIG. 1, the second gate 22 of the switch transistor 2 is also located at the second metal layer 42. The second gate 22 of the switch transistor 2 and the first gate 12 of the phototransistor 1 may be made of a same material at a same layer. In this embodiment, both the switch transistor and the phototransistor are of a bottom gate structure, and the switch transistor and the phototransistor have a same structure, so that the switch transistor and the phototransistor can be manufactured in a same process. This improves fingerprint recognition accuracy, and further reduces structure and process complexity of the display assembly.

Still refer to FIG. 1. Both the first active layer 11 and the second active layer 21 are located on a side that is of the first insulation layer 51 and that is away from the second metal layer 42, and are in contact with the first insulation layer 51. In a making process, after a patterning process of the first gate 12 is completed, the first insulation layer 51 is manufactured on the first gate 12; then the first metal layer 41 is manufactured on the first insulation layer 51; and the first metal layer 41 is patterned to form the first source 13, the first drain 14, the second source 23, and the second drain 24. Then, the first active layer 11 and the second active layer 21 are manufactured. Two ends of the first active layer 11 are respectively connected to the first source 13 and the first drain 14, and two ends of the second active layer 21 are respectively connected to the second source 23 and the second drain 24. Both the first active layer 11 and the second active layer 21 are in contact with the first insulation layer 51, which is equivalent to that the first active layer 11 and the second active layer 21 are located at a height of a same film layer. This can help reduce a thickness of a film layer of the fingerprint recognition module, and further help reduce an overall thickness of the display assembly.

In an embodiment, the first active layer and the second active layer are made of a same material at a same layer, that is, the pattern of the first active layer and the pattern of the second active layer are formed simultaneously in a same process. This can further simplify the process, and reduce complexity of the process.

Figure 3:
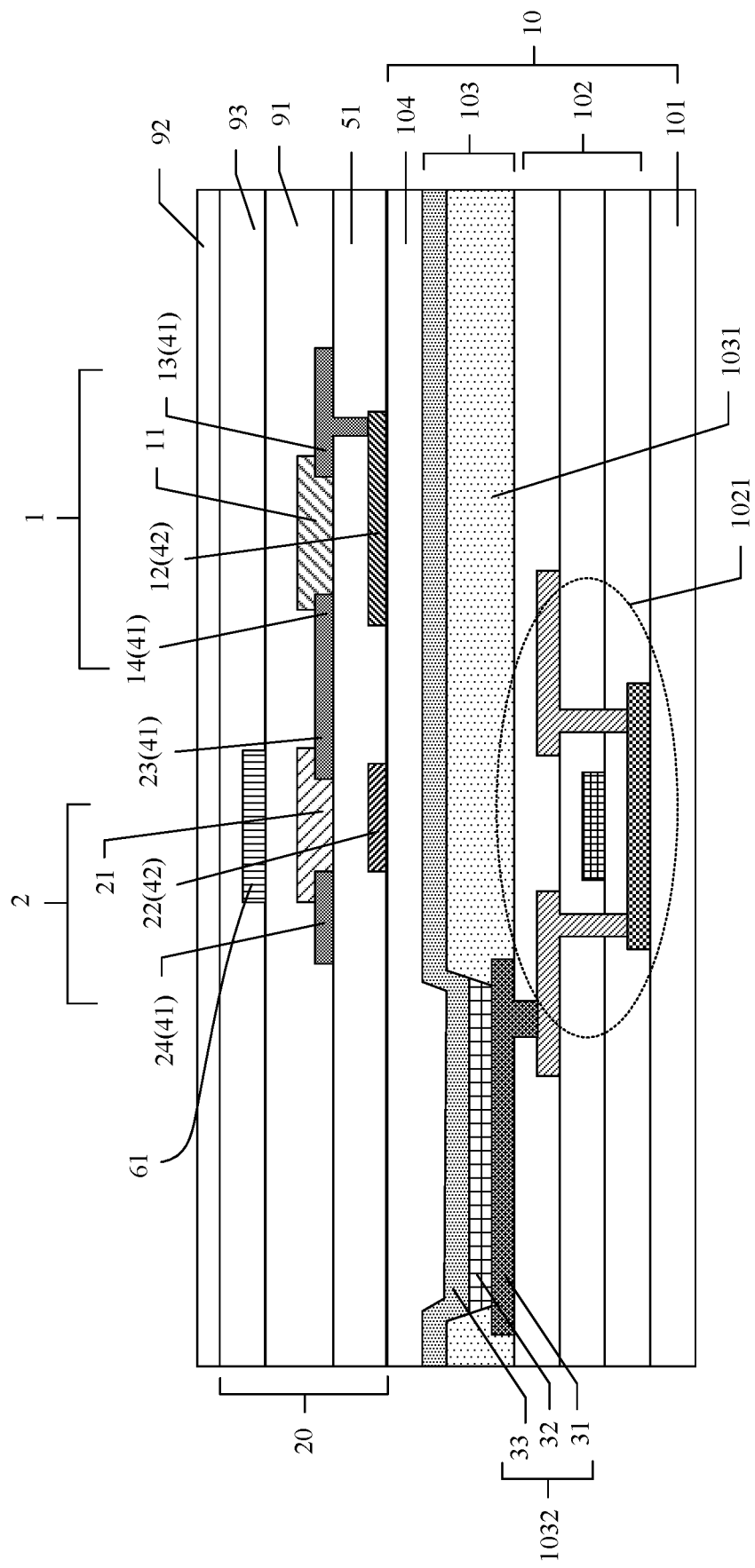
FIG. 3 is another schematic diagram of a partial structure of film layers of a display assembly according to an embodiment of this application.

When the second active layer and the first active layer are made of a same material at a same layer, a light-sensitive band of the second active layer is the same as that of the first active layer. Based on this, to ensure performance reliability of the switch transistor in the fingerprint recognition phase, an embodiment of this application provides another display assembly. FIG. 3 is another schematic diagram of a partial structure of film layers of a display assembly according to an embodiment of this application. The first source 13, the first drain 14, the second source 23, and the second drain 24 are all located at the first metal layer 41. The first gate 12 and the second gate 22 are all located at the second metal layer 42. The first active layer 11 and the second active layer 21 are made of a same material at a same layer, and are in contact with the first insulation layer 51. The fingerprint recognition module 20 further includes a plurality of light shielding parts 61 (only one is shown in the figure), one light shielding part 61 corresponds to one switch transistor 2. The light shielding part 61 is located on a side that is of the second active layer 21 and that is away from the display panel 10, and an orthographic projection of the light shielding part 61 on a plane on which the second active layer 21 is located covers the second active layer 21. A material for making the light shielding part 61 may be a metal material, an organic light absorbing material, or the like. In practice, a corresponding material may be selected based on a light-sensitive band of an organic semiconductor material used in the first active layer to make the light shielding part. This ensures that the light shielding part shields light of the band. The light shielding part can shield light, to prevent the light from irradiating on a surface of the second active layer, so that a carrier inside the second active layer increases. This avoids impact on an on/off status of the switch transistor, and ensures accuracy and performance reliability of fingerprint recognition detection.

Optionally, in the fingerprint recognition phase, a voltage signal needs to be controlled to pass through the light shielding part 61 at a moment when the switch transistor 1 is turned on, and the light shielding part 61 can be used as a gate of the switch transistor 1. Therefore, the switch transistor 1 forms a transistor of a dual-gate structure, and a turn-on speed of the switch transistor 1 can be increased.

In the display assembly according to the embodiment in FIG. 3, the passivation layer 91 is disposed above the first active layer 11 and the second active layer 21, and a planarization layer 93 is further disposed above the light shielding part 61. The display assembly further includes the protective cover 92. Optionally, an anti-impact layer (not shown) is further disposed on the protective cover 92 and the planarization layer 93.

In another embodiment, both the first active layer and the second active layer are in contact with the first insulation layer, and the second active layer and the first active layer are made of different materials. In this case, a light-sensitive band of the second active layer is different from a light-sensitive band of the first active layer. In the fingerprint recognition phase, only the first active layer is sensitive to light emitted by the fingerprint recognition light source. Even though irradiating to a surface of the second active layer, fingerprint reflected light is not absorbed by the second active layer to affect the on/off status of the switch transistor. In this implementation, no light shielding part needs to be disposed at the second active layer to shield light. This can cancel a process of making the light shielding part.

Figure 4:
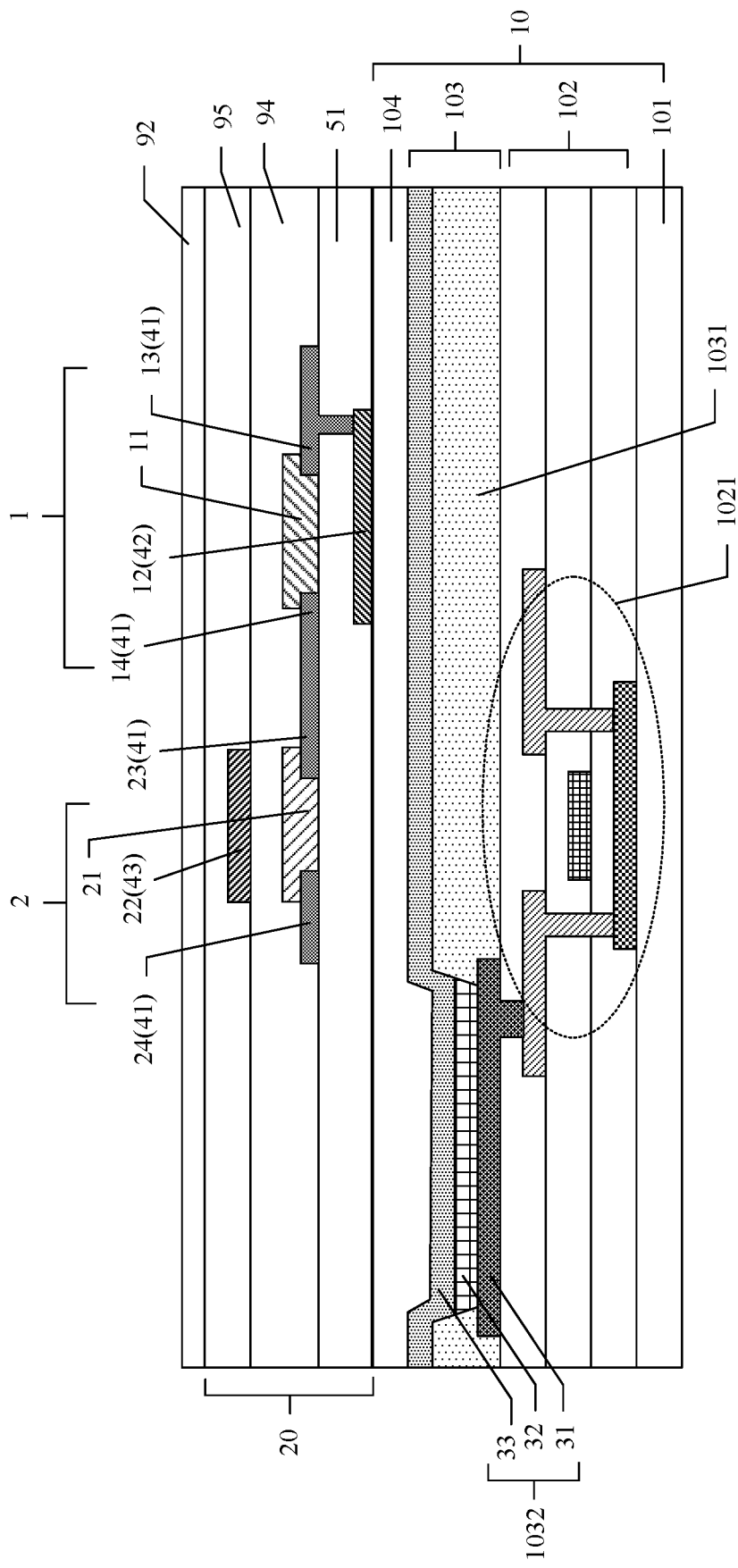
FIG. 4 is another schematic diagram of a partial structure of film layers of a display assembly according to an embodiment of this application.

In another embodiment, the second gate of the switch transistor and the first gate of the phototransistor are located at different metal layers. FIG. 4 is another schematic diagram of a partial structure of film layers of a display assembly according to an embodiment of this application. The first source 13, the first drain 14, the second source 23, and the second drain 24 are all located at the first metal layer 41. The first gate 12 is located at the second metal layer 42. Both the first active layer 11 and the second active layer 21 are located on a side that is of the first insulation layer 51 and that is away from the second metal layer 42, and are in contact with the first insulation layer 51. The fingerprint recognition module 20 further includes a third metal layer 43. The third metal layer 43 is located on a side that is of the first metal layer 41 and that is away from the display panel 10, and the second gate 22 is located at the third metal layer 43. An insulation layer 94 is disposed above the first active layer 11 and the second active layer 21, and a planarization layer 95 is disposed above the second gate 22. The protective cover 92 is further disposed on the planarization layer 95. In this implementation, the first active layer and the second active layer may be made of a same material at a same layer, so as to ensure that the switch transistor and the phototransistor share a part of the making process. This reduces complexity of the making process. In addition, in a fingerprint recognition phase, the second gate disposed on a side that is of the second active layer and that is away from the display panel can be reused as a light shielding part. The second gate can shield light, to prevent fingerprint reflected light from irradiating to a surface of the second active layer, so that a carrier inside the second active layer increases to affect an on/off status of the switch transistor. This ensures accuracy and performance reliability of fingerprint recognition.

Still refer to FIG. 1. The first source 13 is connected to the first gate 12 through a via 511 on the first insulation layer 51. That is, the first gate 12 and the first source 13 of the phototransistor 1 are connected, so that the phototransistor 1 always works in an off status. In this case, when no light irradiates to a surface of the first active layer 11, a leakage current of the phototransistor 1 is very small. However, in the fingerprint recognition phase, when fingerprint reflected light irradiates to the surface of the first active layer 11, a carrier generated inside the first active layer enables the leakage current of the phototransistor 1 to increase obviously, so that it can be ensured that the phototransistor has high optical sensitivity.

Figure 5:
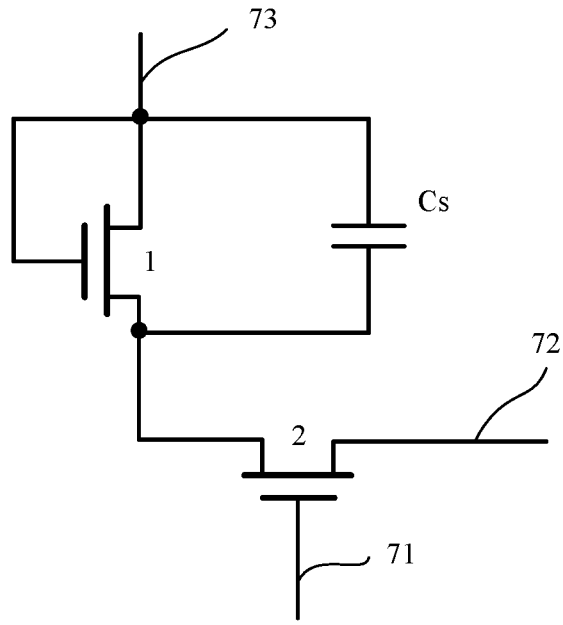
FIG. 5 is a schematic diagram of a circuit structure of a fingerprint recognition unit in a display assembly according to an embodiment of this application.
Figure 6:
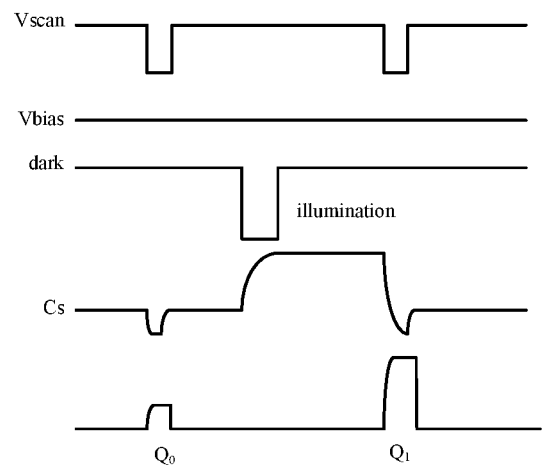
FIG. 6 is a sequence diagram of the fingerprint recognition circuit in the embodiment in FIG. 5.

FIG. 5 is a schematic diagram of a circuit structure of a fingerprint recognition unit in a display assembly according to an embodiment of this application. FIG. 6 is a sequence diagram of the fingerprint recognition circuit in the embodiment in FIG. 5. As shown in FIG. 5, the fingerprint recognition module includes a fingerprint control signal line 71, a fingerprint data signal line 72, and a third voltage signal line 73. A second gate of the switch transistor 2 is electrically connected to the fingerprint control signal line 71, a second drain of the switch transistor 2 is electrically connected to the fingerprint data signal line 72, and both the first gate 12 and the first source 13 are electrically connected to the third voltage signal line 73. It should be noted that the switch transistor and the phototransistor in this embodiment of this application may be p-type transistors, or may be n-type transistors, provided that it is ensured that the switch transistor and the phototransistor are of a same type.

Figure 7:
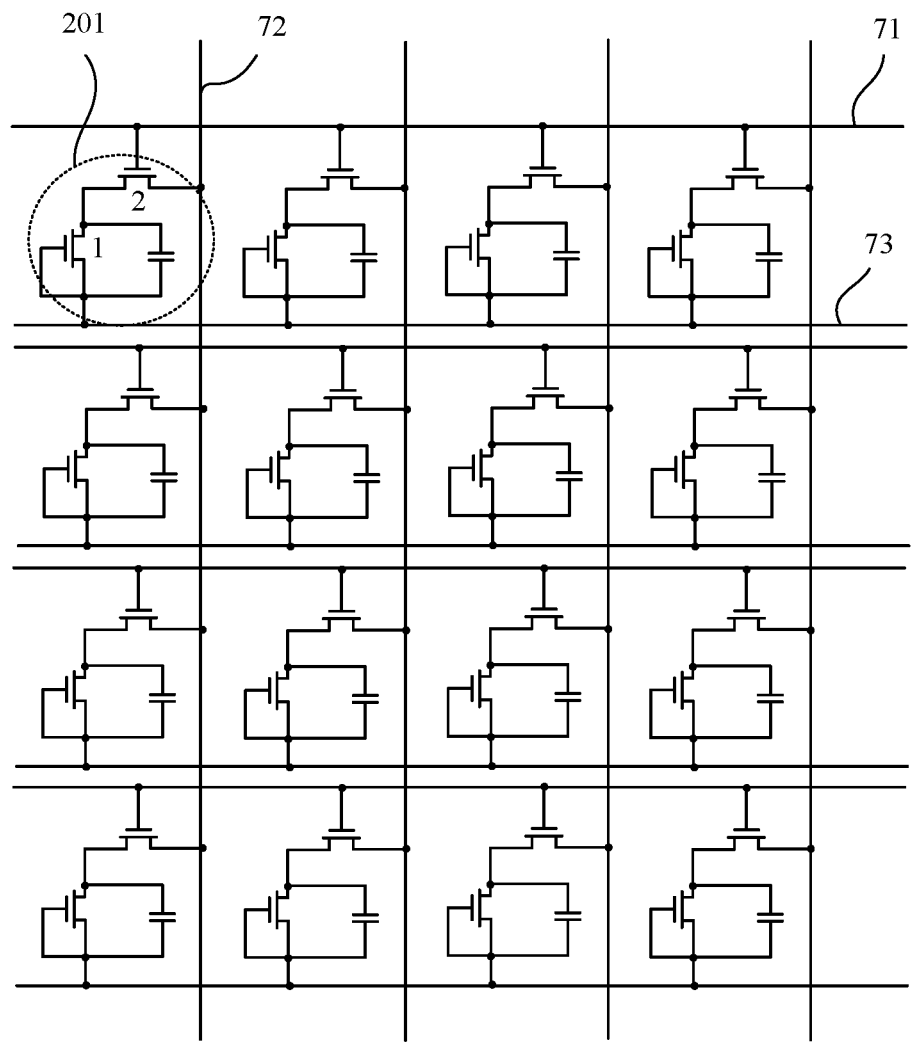
FIG. 7 is a schematic diagram of a circuit structure of a fingerprint recognition module in a display assembly according to an embodiment of this application.

Specifically, a plurality of fingerprint recognition units in the fingerprint recognition module are arranged in an array. FIG. 7 is a schematic diagram of a circuit structure of a fingerprint recognition module in a display assembly according to an embodiment of this application. A plurality of fingerprint recognition units 201 are arranged in an array. Each fingerprint recognition unit 201 includes at least one phototransistor 1 and one switch transistor 2. Second gates of the plurality of switch transistors 2 in a same row are electrically connected to one fingerprint control signal line 71, second drains of the plurality of switch transistors 2 in a same column are electrically connected to one fingerprint data signal line 72, and first gates 12 and first sources 13 of the plurality of phototransistors 1 in a same row are electrically connected to one third voltage signal line 73.

In a related-technology solution in which a fingerprint recognition module includes a switch transistor and a photodiode, to implement a fingerprint recognition function, a voltage signal needs to be separately fed into a gate, a source and a drain of the switch transistor, and one electrode of the photodiode, so that a drive circuit is complex. However, in this embodiment of this application, to implement the fingerprint recognition function, only a voltage signal needs to be fed into the second gate and the second drain of the switch transistor and the first gate (or the first source) of the phototransistor, so that the drive circuit is simple. Only three types of signal lines need to be disposed in the fingerprint recognition module: the fingerprint control signal line, the fingerprint data signal line, and the third voltage signal line. This can also simplify a wiring manner in the fingerprint recognition module, and reduce space occupied by wiring. In addition, the fingerprint recognition circuit is independent of a circuit that drives the display panel to display, and fingerprint recognition detection does not need to be multiplexed with scanning of one frame of picture in a time division manner. This reduces complexity of a circuit structure.

In a fingerprint recognition process: In a startup phase, the fingerprint control signal line 71 provides a fingerprint control signal Vscan to the switch transistor 2, in this phase, the fingerprint control signal line 71 provides a non-valid level signal to control the switch transistor 2 to be turned off, the fingerprint data signal line 72 feeds a read potential into the second drain of the switch transistor 2, the first source and the first gate of the phototransistor 1 are connected, and the third voltage signal line 73 feeds a bias voltage Vbias. In this case, the phototransistor 1 is in an off status, that is, in a dark (dark) state, and under an action of a leakage current of the phototransistor 1, the first capacitor Cs starts charging to accumulate a small amount of charge, which is recorded as an amount of initial charge Q0. In an initial signal reading phase, the fingerprint control signal line 71 provides a valid level signal to the switch transistor 2 to control the switch transistor 2 to be turned on. In this case, the first capacitor Cs discharges, the fingerprint data signal line 72 reads the amount of initial charge Q0 through the second drain 24, and then the fingerprint control signal line 71 provides a non-valid level signal to control the switch transistor 2 to be turned off. In a fingerprint signal accumulation phase, after the phototransistor 1 receives light reflected by a finger, the phototransistor 1 changes from the dark state to an illumination (illumination) state, so that the leakage current of the phototransistor 1 increases. In this case, the amount of charge accumulated during charging of the first capacitor Cs increases, and is recorded as an amount of fingerprint charge Q1. In a fingerprint signal reading phase, the fingerprint control signal line 71 provides a valid level signal to control the switch transistor 2 to be turned on. In this case, the first capacitor Cs discharges, and the fingerprint data signal line 72 reads the amount of fingerprint charge Q1 through the second drain 24.

Specifically, the fingerprint data signal line 72 and the second drain are located at a same metal layer, that is, the fingerprint data signal line 72 is located at the first metal layer (refer to a film layer position shown in FIG. 1). In this case, the fingerprint data signal line 72 and the second drain may be manufactured in a same process, and the fingerprint data signal line 72 and the second drain do not need to be connected through a via of an insulation layer. This simplifies the process. The fingerprint control signal line 71 and the second gate are located at a same metal layer, the fingerprint control signal line 71 and the second gate are manufactured in a same making process, and the fingerprint control signal line 71 and the second gate do not need to be connected through a via of an insulation layer. This simplifies the making process. In addition, the third voltage signal line 73 may be located at a same metal layer as the first gate, or may be located at a same metal layer as the first source.

In an embodiment, the fingerprint data signal line and the second drain are located at the first metal layer, the fingerprint control signal line and the second gate are located at the third metal layer, and the third voltage signal line and the first gate are located at the second metal layer. The fingerprint data signal line, the fingerprint control signal line, and the third voltage signal line are separately wired at three different metal layers. This can reduce wiring density at each metal layer.

Figure 8:
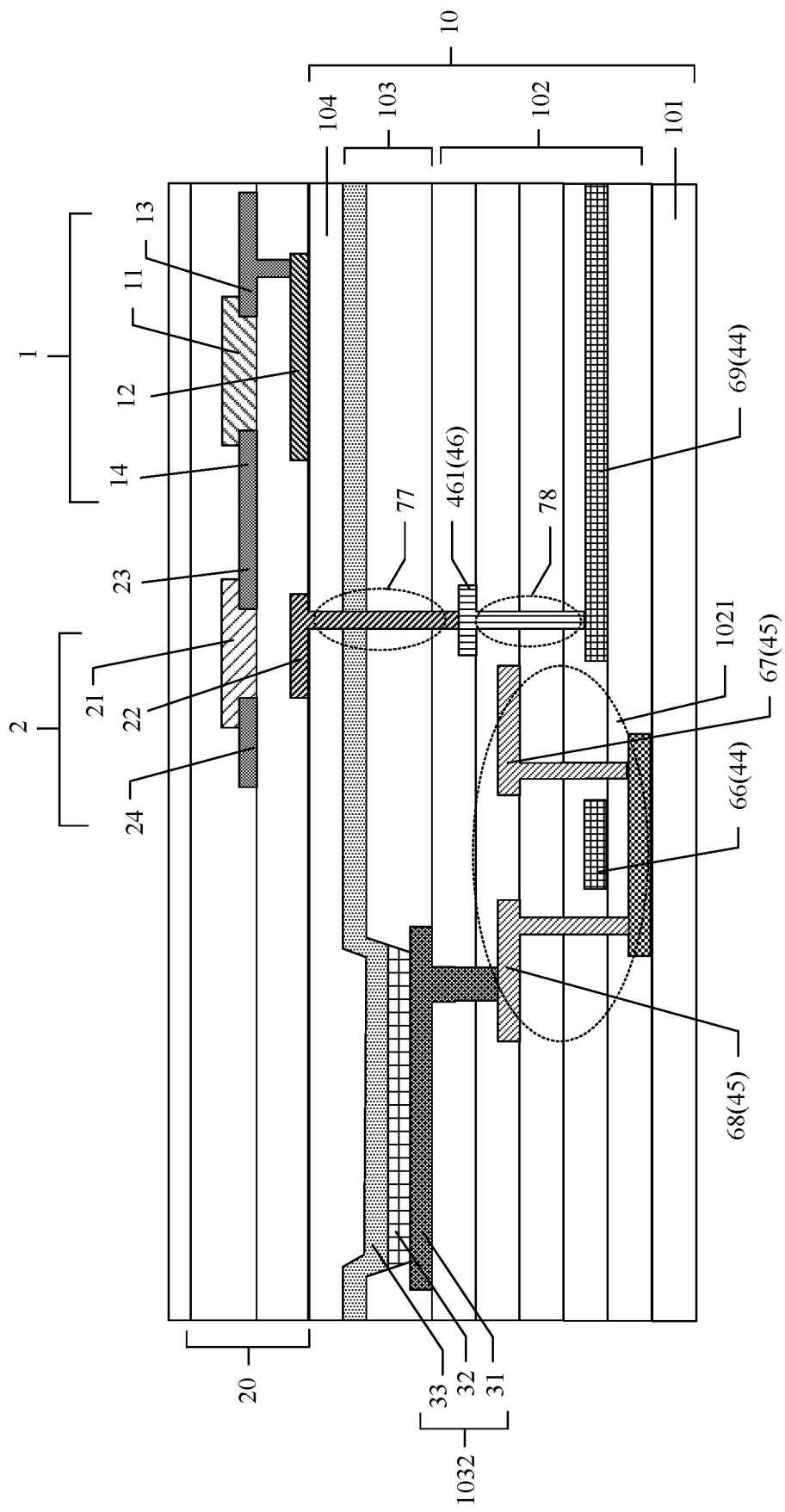
FIG. 8 is another schematic diagram of a partial structure of film layers of a display assembly according to an embodiment of this application.

In another embodiment, FIG. 8 is another schematic diagram of a partial structure of film layers of a display assembly according to an embodiment of this application. The display panel is an organic light emitting display panel. As shown in FIG. 8, the display panel includes a substrate 101, an array substrate 102, a display layer 103, and an encapsulation structure 104 that are sequentially arranged. The array substrate 102 includes a gate metal layer 44, a capacitor metal layer (not shown), a source/drain metal layer 45, and a fourth metal layer 46. An insulation layer is disposed between two adjacent metal layers. A gate 66 of the drive transistor 1021 and a gate scanning line 69 (only shown in the figure) of the display panel are located at the gate metal layer 44. A source 67 and a drain 68 of the drive transistor 1021 and a data line of the display panel are located at the source/drain metal layer 45. A capacitor plate in the pixel circuit and a reset signal line in the display panel are located at the capacitor metal layer. A positive power signal line in the display panel is located at the fourth metal layer 46. Optionally, the second gate 22 of the switch transistor 2 in the fingerprint recognition module 20 is connected to the gate scanning line 69. The figure shows that the second gate 22 is electrically connected to the gate scanning line 69 through at least one connection electrode 461. Optionally, the connection electrode 461 is located at the fourth metal layer 46. The second gate 22 is electrically connected to the connection electrode 461 through a via 77 that penetrates through the encapsulation structure 104 and the display layer 103, and the connection electrode 461 is electrically connected to the gate scanning line 69 through a via 78 on the insulation layer. In other words, in the fingerprint recognition phase, the gate scanning line 69 is reused as the fingerprint control signal line, and a control signal is provided to the switch transistor 2 through the gate scanning line 69. In addition, the second drain 24 of the switch transistor 2 in the fingerprint recognition module may be electrically connected to a data line located at the source/drain metal layer 45, and the data line is reused as a fingerprint data signal line in the fingerprint recognition phase. The first gate 12 of the phototransistor 1 in the fingerprint recognition module may be electrically connected to the positive power signal line at the fourth metal layer 46, and the positive power signal line is reused as a third voltage signal line in the fingerprint recognition phase. In this implementation, a line that is in the array substrate and that drives the display panel to display is reused as a signal line in the fingerprint recognition module. A display drive time sequence and a fingerprint recognition drive time sequence cooperate with each other, so that both a display function and a fingerprint recognition function can be implemented.

Figure 9:
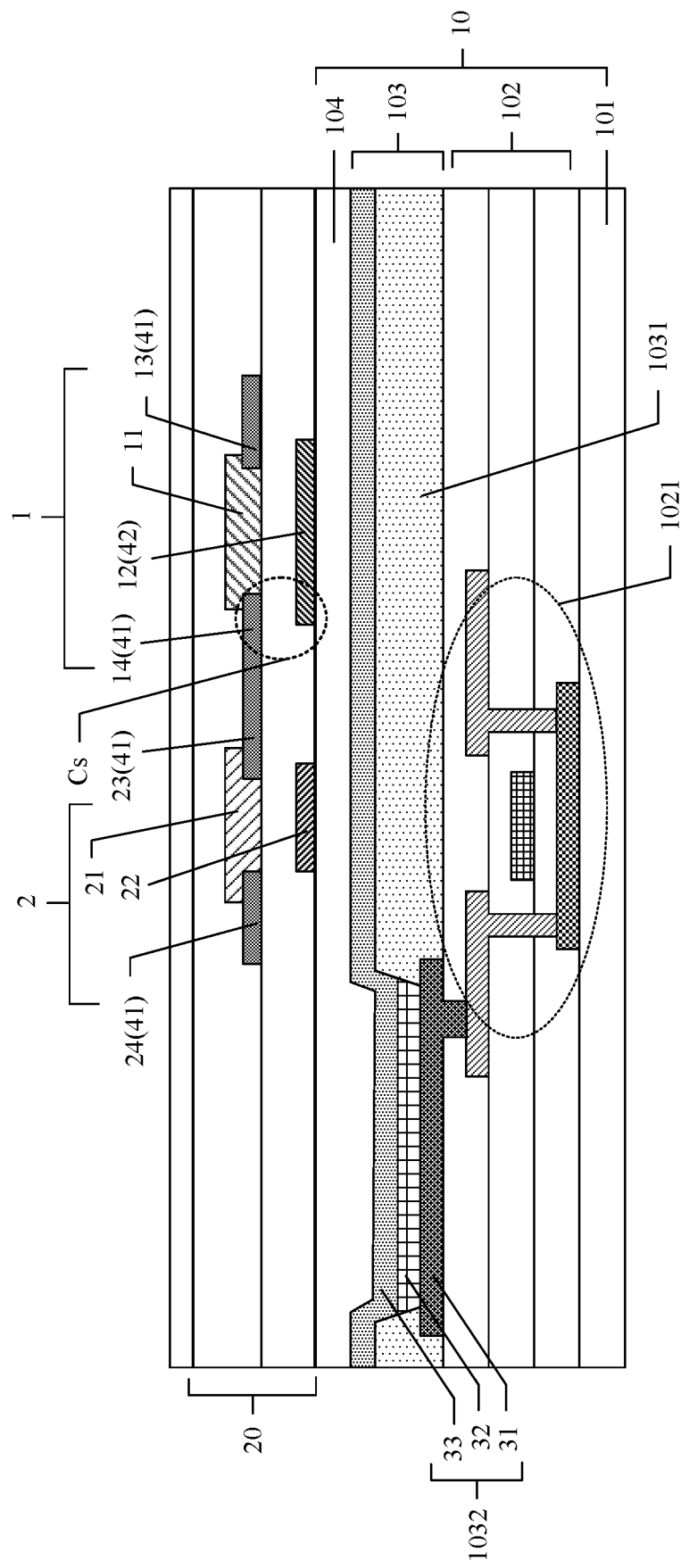
FIG. 9 is another schematic diagram of a partial structure of film layers of a display assembly according to an embodiment of this application.
Figure 10:
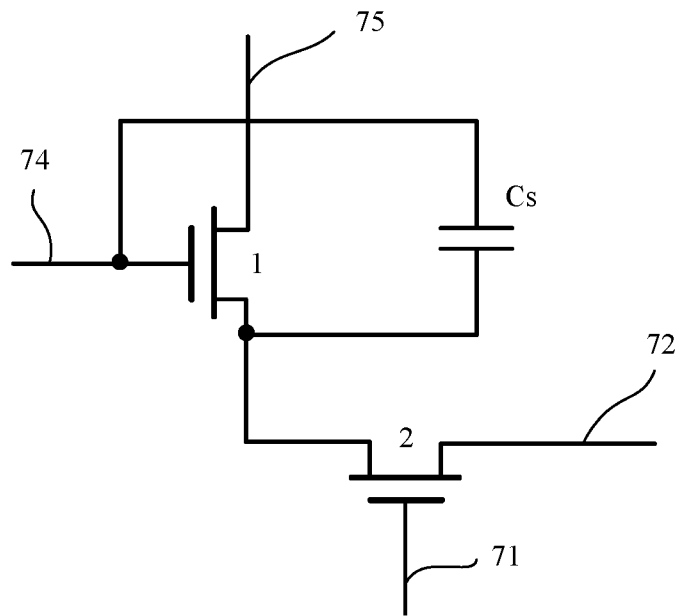
FIG. 10 is a schematic diagram of a circuit structure of a fingerprint recognition unit according to an embodiment of FIG. 9.

In another embodiment, the first source and the first gate are not connected, and in the fingerprint recognition phase, the phototransistor is controlled to work in the off status by separately controlling a value of a voltage supplied to the first source and a value of a voltage supplied to the first gate. FIG. 9 is another schematic diagram of a partial structure of film layers of a display assembly according to an embodiment of this application. FIG. 10 is a schematic diagram of a circuit structure of a fingerprint recognition unit according to an embodiment of FIG. 9.

As shown in FIG. 9, that the display panel 10 is an organic light emitting display panel is still used as an example, and the fingerprint recognition module 20 is located on the light-emitting surface of the display panel 10. The fingerprint recognition module 20 includes a plurality of fingerprint recognition units. Each fingerprint recognition unit includes at least one phototransistor 1 and one switch transistor 2. The phototransistor 1 includes a first active layer 11, a first gate 12, a first source 13, and a first drain 14. A material for making the first active layer 11 includes an organic semiconductor material. The first drain 14 and the first gate 12 partially overlap to form a first capacitor Cs. The switch transistor 2 includes a second active layer 21, a second gate 22, a second source 23, and a second drain 24. The first drain 14 is connected to the second source 23. Different from the embodiment in FIG. 1, in the embodiment in FIG. 9, the first source 13 and the first gate 12 are not connected.

As shown in FIG. 10, the fingerprint recognition module includes a fingerprint control signal line 71, a fingerprint data signal line 72, a first voltage signal line 74, and a second voltage signal line 75. The second gate is electrically connected to the fingerprint control signal line 71, the second drain is electrically connected to the fingerprint data signal line 72, the first gate is electrically connected to the first voltage signal line 74, and the first source is electrically connected to the second voltage signal line 75. In a fingerprint recognition phase, a voltage supplied by the first voltage signal line 74 to the first gate is greater than a voltage supplied by the second voltage signal line 75 to the first source. Therefore, when the first voltage signal line 74 feeds a voltage signal into the first gate, and the second voltage signal line 75 feeds a voltage signal into the first source, the phototransistor 1 can be controlled to be in an off status.

In this implementation, a working process of the fingerprint recognition unit may be understood with reference to the foregoing embodiments in FIG. 5 and FIG. 6, and details are not described herein again.

Figure 11:
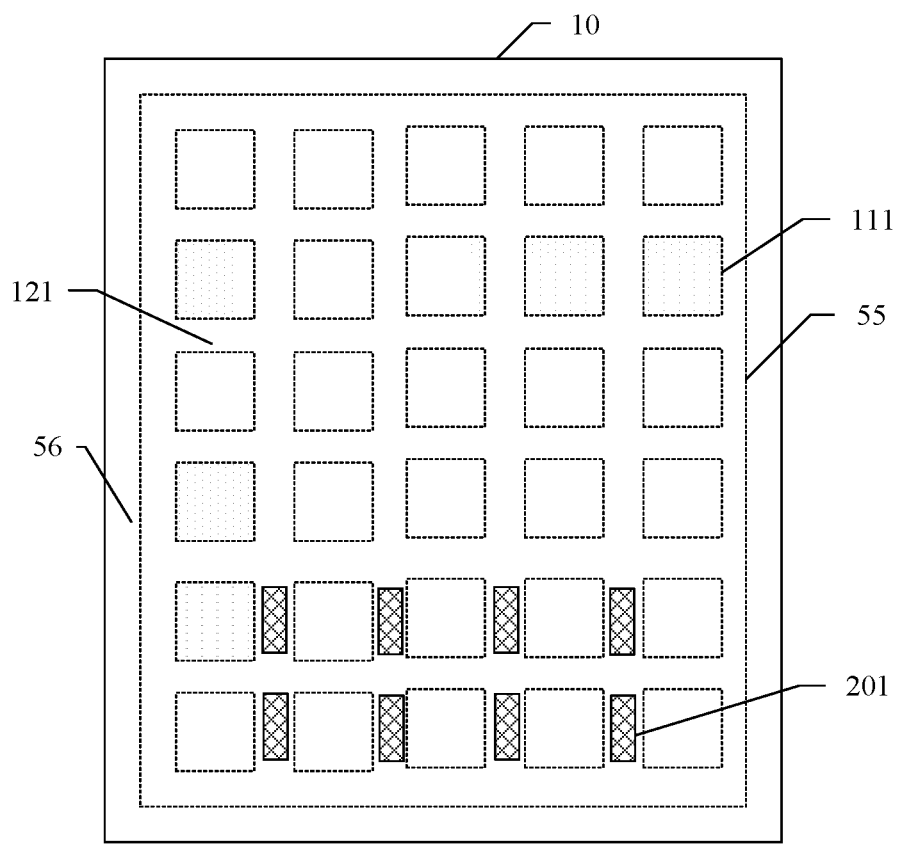
FIG. 11 is a schematic top view of a partial display assembly according to an embodiment of this application.

Further, FIG. 11 is a schematic top view of a partial display assembly according to an embodiment of this application. As shown in FIG. 11, the display panel 10 includes a display area 55 and a non-display area 56, and the display area 55 includes a plurality of pixel areas 111 and a non-pixel area 121 located between adjacent pixel areas 111. The pixel area 111 is a pixel light emitting area, and the non-pixel area 121 is a non-light emitting area. An organic light emitting display panel is used as an example. The pixel area 111 is an area in which a light emitting component is located, and the non-pixel area 121 is an area in which a pixel definition layer spaced from a light emitting component is located. A liquid crystal display panel is used as an example. The liquid crystal display panel includes a black matrix, and the black matrix includes a plurality of openings. An area exposed by the opening is the pixel area 111, and an area between adjacent openings is the non-pixel area. An orthographic projection of the fingerprint recognition unit 201 on the display panel 10 is located in the non-pixel area 121. An orthographic projection direction of the fingerprint recognition unit 201 towards the display panel 10 is the same as a top-view direction. Therefore, in the top-view direction, the fingerprint recognition unit 201 coincides with an orthographic projection of the fingerprint recognition unit 201 on the display panel 10. In the top view, the fingerprint recognition unit 201 represents an orthographic projection of the fingerprint recognition unit 201 on the display panel 10. FIG. 11 shows that the fingerprint recognition unit 201 is disposed in only some fixed areas. Optionally, the fingerprint recognition unit may alternatively be disposed on an entire surface of a corresponding display area. In this implementation, the fingerprint recognition unit corresponds to a non-pixel area of the display panel. When the display assembly displays, the fingerprint recognition unit does not shield light emission of a pixel area, so that it is ensured that deposition of the fingerprint recognition module does not affect a display effect.

Figure 12:
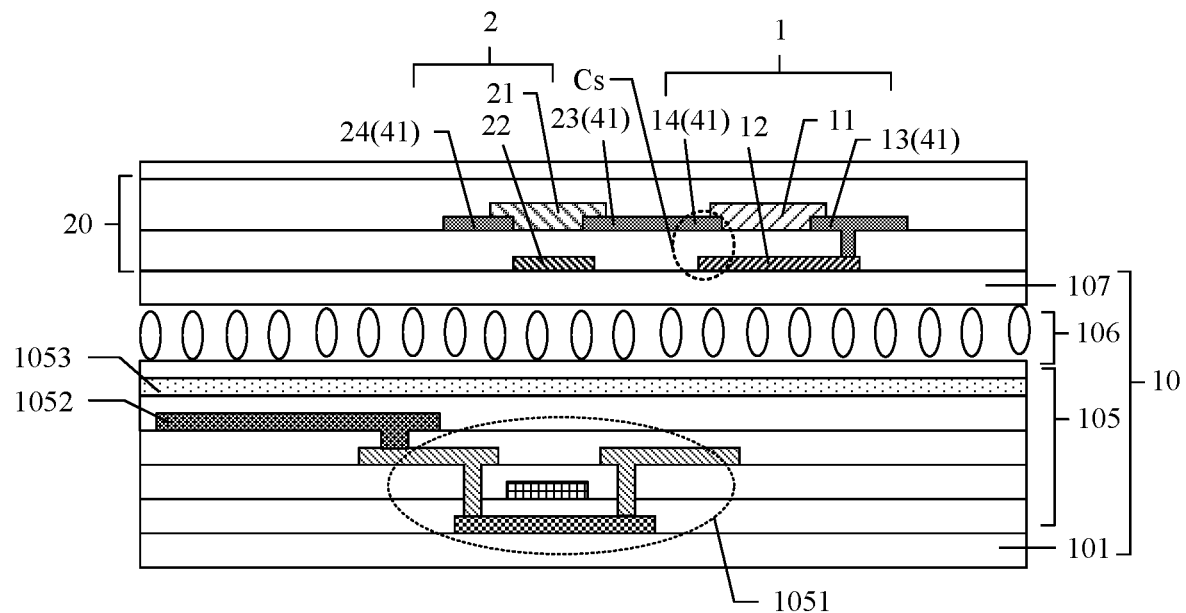
FIG. 12 is another schematic diagram of a partial structure of film layers of a display assembly according to an embodiment of this application.

In all the foregoing embodiments, an example in which the display panel is an organic light emitting display panel is used for description. In the display assembly provided in this embodiment of this application, the display panel may also be a liquid crystal display panel. For details, refer to FIG. 12. FIG. 12 is another schematic diagram of a partial structure of film layers of a display assembly according to an embodiment of this application. The display panel 10 includes a substrate 101, an array substrate 105, a liquid crystal molecule layer 106, and a color filter substrate 107 that are stacked in sequence. The array substrate 105 includes a plurality of pixel circuits. In the figure, only a drive transistor 1051 in the pixel circuit is used as an example. The array substrate further includes a pixel electrode 1052 and a common electrode 1053. The drive transistor 1051 is connected to the pixel electrode 1052. Relative positions of the pixel electrode 1052 and the common electrode 1053 in the figure may be interchanged. The color filter substrate 107 includes a chromatography layer and a black matrix. The fingerprint recognition module is located on the display panel. The fingerprint recognition module 20 includes a fingerprint recognition unit, and the fingerprint recognition unit includes at least one phototransistor 1 and one switch transistor 2. For a structure of the phototransistor 1 and a structure of the switch transistor 2 in the fingerprint recognition module, refer to the descriptions in any one of the foregoing embodiments. Details are not described herein again.

Figure 13:
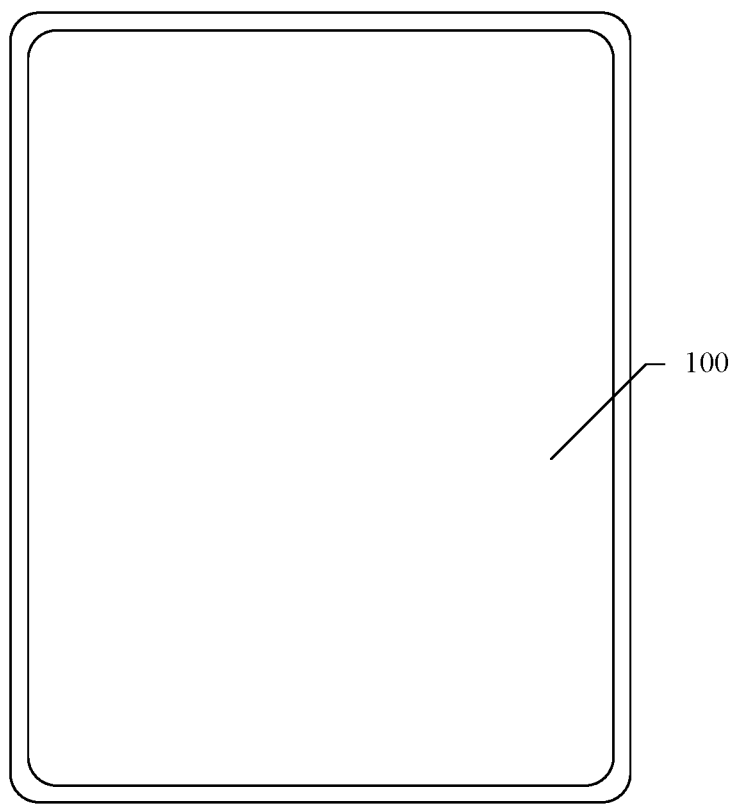
FIG. 13 is a schematic diagram of a display apparatus according to an embodiment of this application.

Based on a same inventive concept, an embodiment of this application further provides a display apparatus. FIG. 13 is a schematic diagram of a display apparatus according to an embodiment of this application. As shown in FIG. 13, the display apparatus includes the display assembly 100 provided in any embodiment of this application. A specific structure of the display assembly 100 has been described in detail in the foregoing embodiment, and details are not described herein again. Certainly, the display apparatus shown in FIG. 13 is merely an example for description. The display apparatus may be any electronic device having a fingerprint recognition function, such as a mobile phone, a tablet computer, a notebook computer, an e-book, or a television. The display apparatus may be a rigid display apparatus, or may be a flexible or foldable display apparatus. In an embodiment, a pixel unit on a display panel is reused as a light source for fingerprint recognition in a fingerprint recognition phase. In another embodiment, the display apparatus includes a fingerprint recognition light source. The fingerprint recognition light source is located on a side that is of the display panel and that is away from a fingerprint recognition module. The fingerprint recognition light source may be an infrared light source, or may be a visible light source.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A display assembly, comprising:
   a display panel including a first surface and a second surface opposite to the first surface, wherein the first surface is a light-emitting surface;
   a protective cover; and
   a fingerprint recognition module located on the light-emitting surface of the display panel and between the display panel and the protective cover, wherein:
      the fingerprint recognition module comprises a plurality of fingerprint recognition units, and each fingerprint recognition unit comprises at least one phototransistor and one switch transistor;
      the phototransistor comprises a first active layer, a first gate, a first source, and a first drain, a material for making the first active layer comprises an organic semiconductor material, in a direction perpendicular to the display assembly, the first drain and the first gate partially overlap to form a first capacitor, and the first source is connected to the first gate through a via in a first insulation layer of the fingerprint recognition module;
      the switch transistor comprises a second active layer, a second gate, a second source, and a second drain; and
      the fingerprint recognition module comprises a first metal layer, wherein the first metal layer is patterned to form the first source, the first drain, the second source, and the second drain, and the first drain is connected to the second source.

2. The display assembly according to claim 1, wherein:
   the fingerprint recognition module further comprises a second metal layer, the second metal layer is located on a side of the first metal layer close to the display panel, and the first insulation layer is located between the first metal layer and the second metal layer; and
   the first gate is located at the second metal layer.

3. The display assembly according to claim 2, wherein both the first active layer and the second active layer are located on a side of the first insulation layer away from the second metal layer, and are in contact with the first insulation layer.

4. The display assembly according to claim 2, wherein:
   the fingerprint recognition module comprises a fingerprint control signal line, a fingerprint data signal line, a first voltage signal line, and a second voltage signal line; and
   the second gate is electrically connected to the fingerprint control signal line, the second drain is electrically connected to the fingerprint data signal line, the first gate is electrically connected to the first voltage signal line, and the first source is electrically connected to the second voltage signal line, wherein, in a fingerprint recognition phase, a voltage supplied by the first voltage signal line to the first gate is greater than a voltage supplied by the second voltage signal line to the first source.

5. The display assembly according to claim 1, wherein:
   the fingerprint recognition module comprises a fingerprint control signal line, a fingerprint data signal line, and a third voltage signal line; and
   the second gate is electrically connected to the fingerprint control signal line, the second drain is electrically connected to the fingerprint data signal line, and both the first gate and the first source are electrically connected to the third voltage signal line.

6. The display assembly according to claim 2, wherein the second gate is located at the second metal layer.

7. The display assembly according to claim 6, wherein the second active layer and the first active layer are made of a same material at a same layer.

8. The display assembly according to claim 7, wherein the fingerprint recognition module further comprises a plurality of light shielding parts, the light shielding part is located on a side of the second active layer away from the display panel, and an orthographic projection of the light shielding part on a plane on which the second active layer is located covers the second active layer.

9. The display assembly according to claim 1, wherein the fingerprint recognition module further comprises a third metal layer, the third metal layer is located on a side of the first metal layer away from the display panel, and the second gate is located at the third metal layer.

10. The display assembly according to claim 1, wherein:
    the display panel comprises a plurality of pixel areas and a non-pixel area located between the adjacent pixel areas; and
    an orthographic projection of the fingerprint recognition unit on the display panel is located in the non-pixel area and between two adjacent pixel areas.

11. The display assembly according to claim 1, wherein the phototransistor has a bottom gate structure.

12. The display assembly according to claim 1, wherein the phototransistor and the switch transistor have a same structure.

13. A display apparatus, comprising a display assembly, wherein the display assembly comprises a display panel, a fingerprint recognition module located on the display panel, and a protective cover, and wherein:
    the display panel includes a first surface and a second surface opposite to the first surface, the first surface is a light-emitting surface, and the fingerprint recognition module is between the display panel and the protective cover and is relatively closer to the light-emitting surface than the second surface;

the fingerprint recognition module comprises a plurality of fingerprint recognition units, and each fingerprint recognition unit comprises at least one phototransistor and one switch transistor;

the phototransistor comprises a first active layer, a first gate, a first source, and a first drain, a material for making the first active layer comprises an organic semiconductor material, in a direction perpendicular to the display assembly, the first drain and the first gate partially overlap to form a first capacitor, and the first source is connected to the first gate through a via in a first insulation layer of the fingerprint recognition module;

the switch transistor comprises a second active layer, a second gate, a second source, and a second drain; and the fingerprint recognition module comprises a first metal layer, wherein the first metal layer is patterned to form the first source, the first drain, the second source, and the second drain, and the first drain is connected to the second source.

14. The display apparatus according to claim 13, wherein:
the fingerprint recognition module further comprises a second metal layer, the second metal layer is located on a side of the first metal layer close to the display panel, and the first insulation layer is located between the first metal layer and the second metal layer; and
the first gate is located at the second metal layer.

15. The display apparatus according to claim 14, wherein both the first active layer and the second active layer are located on a side of the first insulation layer away from the second metal layer, and are in contact with the first insulation layer.

16. The display apparatus according to claim 13, wherein:
the fingerprint recognition module comprises a fingerprint control signal line, a fingerprint data signal line, a first voltage signal line, and a second voltage signal line; and
the second gate is electrically connected to the fingerprint control signal line, the second drain is electrically connected to the fingerprint data signal line, the first gate is electrically connected to the first voltage signal line, and the first source is electrically connected to the second voltage signal line, wherein, in a fingerprint recognition phase, a voltage supplied by the first voltage signal line to the first gate is greater than a voltage supplied by the second voltage signal line to the first source.

17. The display apparatus according to claim 13, wherein:
the fingerprint recognition module comprises a fingerprint control signal line, a fingerprint data signal line, and a third voltage signal line; and
the second gate is electrically connected to the fingerprint control signal line, the second drain is electrically connected to the fingerprint data signal line, and both the first gate and the first source are electrically connected to the third voltage signal line.

18. The display apparatus according to claim 14, wherein the second gate is located at the second metal layer.

19. The display apparatus according to claim 13, wherein the second active layer and the first active layer are made of a same material at a same layer.

20. A fingerprint recognition method for a display assembly, wherein the display assembly comprises a display panel, a fingerprint recognition module located on the display panel, and a protective cover, and wherein:

the display panel includes a first surface and a second surface opposite to the first surface, the first surface is a light-emitting surface, and the fingerprint recognition module is between the display panel and the protective cover and is relatively closer to the light-emitting surface than the second surface;

the fingerprint recognition module comprises a plurality of fingerprint recognition units, and each fingerprint recognition unit comprises at least one phototransistor and one switch transistor;

the phototransistor comprises a first active layer, a first gate, a first source, and a first drain, a material for making the first active layer comprises an organic semiconductor material, in a direction perpendicular to the display assembly, the first drain and the first gate partially overlap to form a first capacitor, and the first source is connected to the first gate through a via in a first insulation layer of the fingerprint recognition module;

the switch transistor comprises a second active layer, a second gate, a second source, and a second drain; and the fingerprint recognition module comprises a first metal layer, wherein the first metal layer is patterned to form the first source, the first drain, the second source, and the second drain, and the first drain is connected to the second source; and wherein the fingerprint recognition method comprises:
controlling both the switch transistor and the phototransistor to be turned off, and charging the first capacitor to accumulate an amount of initial charge under an action of a leakage current of the phototransistor;
controlling the switch transistor to be turned on, discharging the first capacitor, and controlling the switch transistor to be turned off after reading the amount of initial charge through the second drain;
after the phototransistor receives light reflected by a finger, increasing the leakage current, and charging the first capacitor to accumulate an amount of fingerprint charge; and
controlling the switch transistor to be turned on, discharging the first capacitor, and reading the amount of fingerprint charge through the second drain.

* * * * *